(12) United States Patent
Peet

(10) Patent No.: US 9,995,350 B2
(45) Date of Patent: Jun. 12, 2018

(54) SWITCHABLE ONE WAY CLUTCH INCLUDING SELECTOR BRACKET

(71) Applicant: Schaeffler Technologies AG & Co. KG, Herzogenaurach (DE)

(72) Inventor: Brian Peet, Wadsworth, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 391 days.

(21) Appl. No.: 14/823,300

(22) Filed: Aug. 11, 2015

(65) Prior Publication Data
US 2017/0045099 A1  Feb. 16, 2017

(51) Int. Cl.
| F16D 41/066 | (2006.01) |
| F16D 41/08 | (2006.01) |
| F16D 47/04 | (2006.01) |
| F16D 41/04 | (2006.01) |
| F16D 41/06 | (2006.01) |

(52) U.S. Cl.
CPC ......... *F16D 41/066* (2013.01); *F16D 41/088* (2013.01); *F16D 47/04* (2013.01); *F16D 41/04* (2013.01); *F16D 2041/0605* (2013.01)

(58) Field of Classification Search
CPC .................................................. F16D 41/088
See application file for complete search history.

(56) References Cited

U.S. PATENT DOCUMENTS

| 3,426,874 A * | 2/1969 | Johnston, Jr. .......... F16D 23/02 192/38 |
| 5,152,726 A * | 10/1992 | Lederman ............ F16D 41/088 188/82.3 |
| 5,178,250 A * | 1/1993 | Ashikawa ............ F16D 41/088 192/38 |
| 8,312,792 B1 * | 11/2012 | Kochidomari .......... F16D 27/10 411/113 |
| 2005/0236246 A1 * | 10/2005 | Joki ....................... B60K 17/02 192/35 |
| 2012/0152686 A1 * | 6/2012 | Brewer ................... F16D 27/10 192/84.1 |
| 2014/0102844 A1 | 4/2014 | Greene et al. |

* cited by examiner

*Primary Examiner* — Mark A Manley
(74) *Attorney, Agent, or Firm* — LeKeisha M. Suggs

(57) ABSTRACT

A selector bracket assembly for a one way clutch assembly comprising an annular body portion having: first and second radial surfaces; an inner circumferential surface, connecting the first and second radial surfaces; at least one cutout portion; at least one axially extending post adjacent to the at least one cutout portion; and, an outer circumferential surface including a plurality of radially outward extending tabs; and, at least one actuator pin disposed radially outward of the inner circumferential surface and arranged for engagement with the selector bracket assembly to lock a one way clutch. A switchable one way clutch assembly having said selector bracket, or at least two selector brackets for making selectable the following states: free wheel or locked in both the first and second opposing circumferential directions; locked in first and free wheel in second circumferential direction; and, free wheel in first and locked in second circumferential direction.

14 Claims, 4 Drawing Sheets

SWITCHABLE ONE WAY CLUTCH INCLUDING SELECTOR BRACKET

FIELD

The invention relates generally to at least one one way clutch selectable to be free or locked in a single circumferential direction.

BACKGROUND

U.S. Patent Publication No. 2014/0102844, hereby incorporated by reference herein, discloses an actuation member for use selectively in a clutch for a transmission.

BRIEF SUMMARY

Example aspects broadly comprise a selector bracket assembly for a one way clutch assembly comprising: a selector bracket annular body portion having: a first radial surface; a second radial surface, opposite the first radial surface; an inner circumferential surface, connecting the first and second radial surfaces; at least one cutout portion; at least one axially extending post adjacent to the at least one cutout portion; and, an outer circumferential surface including a plurality of radially outward extending tabs; and, at least one actuator pin disposed radially outward of the inner circumferential surface and arranged for engagement with the selector bracket assembly to lock a one way clutch. In an example aspect, the at least one actuator pin is disengageable to allow the one way clutch assembly to free wheel in at least one direction. In an example aspect, the at least one axially extending post includes a planar surface arranged for urging a roller away from an outer race inner ramp for unlocking the one way clutch in a neutral state. In an example aspect, a plurality of circumferentially extending bracket springs disposed adjacent to the plurality of radially outward extending tabs; wherein the circumferentially extending bracket springs are arranged for circumferential movement of the selector bracket assembly with respect to an outer race. In an example aspect, the at least one cutout portion includes a rounded surface having a first width (w1), a side having a second width (w2), and a recess; wherein the second width (w2) is greater than the first width (w1); and, wherein the rounded surface is connected to the planar surface of the at least one axially extending post. In an example aspect, the selector bracket assembly further comprises a plurality of apertures extending from the first radial surface to the second radial surface and arranged for receiving a plurality of positioning pins.

Other example aspects broadly comprise a switchable one way clutch assembly comprising: a first outer race and a first inner race disposed radially inward of the first outer race; at least one selector bracket assembly as in the above paragraphs; a splined central race disposed between the first inner race and the at least one selector bracket and including axially protruding dog teeth arranged for engagement with the first inner race; a first plurality of rollers and a first plurality of roller springs disposed between the first inner race and the first outer race.

Other example aspects broadly comprise a switchable one way clutch assembly comprising: first and second outer races; at least one selector bracket assembly as in the above paragraphs disposed between the first and second outer races; first and second inner races disposed radially inward of the first and second outer races, respectively; a splined central race disposed between the first and second inner races and including axially protruding dog teeth arranged for engagement with the first and second inner races respectively; a first plurality of rollers and a first plurality of roller springs disposed between the first inner race and the first outer race; and, a second plurality of rollers and a second plurality of roller springs disposed between the second inner race and the second outer race.

Other example aspects broadly comprise a switchable one way clutch assembly comprising: first and second outer races; at least one selector bracket disposed between the first and second outer races; first and second inner races disposed radially inward of the first and second outer races, respectively; a splined central race disposed between the first and second inner races and including axially protruding dog teeth arranged for engagement with the first and second inner races; a first plurality of rollers and a first plurality of roller springs disposed between the first inner race and the first outer race; and, a second plurality of rollers and a second plurality of roller springs disposed between the second inner race and the second outer race. In an example aspect, the switchable one way clutch assembly further comprises first and second thin section bearings, the first thin section bearing disposed between the first inner race and the first outer race and the second thin section bearing disposed between the second inner race and the second outer race. In an example aspect, the at least one selector bracket is arranged to vary between a lock-free wheel state and a lock-lock state. In an example aspect, the switchable one way clutch assembly further comprises and an actuator pin, wherein the actuator pin is disengageable in a lock-free wheel state and engageable with the at least one selector bracket in a lock-lock state. In an example aspect, the at least one selector bracket further comprises an annular body portion including a first radial surface and a second radial surface opposite the first radial surface. In an example aspect, the at least one selector bracket further comprises an inner circumferential surface having at least one cutout portion and at least one axially extending post adjacent to the cutout portion; and an outer circumferential surface having a plurality of radially outward extending tabs and a plurality of circumferentially extending bracket springs adjacent to the radially extending tabs. In an example aspect, the second outer race further includes at least one outer race inner ramp, wherein the at least one inner ramp is arranged to engage at least one roller in a lock-lock state.

Other example aspects broadly comprise a switchable one way clutch assembly comprising: a first outer race and a first inner race disposed radially inward of the first outer race; at least one selector bracket assembly including an actuator pin and a plurality of circumferentially extending bracket springs; a splined central race disposed between the first inner race and the at least one selector bracket and including axially protruding dog teeth arranged for engagement with the first inner race; a first plurality of rollers and a first plurality of roller springs disposed between the first inner race and the first outer race; wherein in a neutral state: the actuator pin is disengaged; the plurality of circumferentially extending bracket springs are arranged for pushing the selector bracket into a neutral position; the first plurality of rollers are arranged for pushing against the first plurality of roller springs for disengagement from the first outer race; and, the first outer race is arranged to spin freely in a first circumferential direction; and, wherein in an active state: the actuator pin is displaced radially inward to engage and the first inner race is not movable in a first circumferential direction; the first plurality of rollers are disposed and in contact with the first inner race and the first outer race; and, the first outer race is arranged to lock. In an example aspect, the at least one selector bracket further comprises an annular body portion including a first radial surface, a second radial surface opposite the first radial surface, and an inner circumferential surface having at least one cutout portion. In an example aspect, the first outer race further includes at least one outer race inner ramp, wherein the at least one inner ramp is arranged to engage at least one roller in a lock-lock state. In an example aspect, the switchable one way clutch assembly further includes a second outer race and a second inner race disposed radially inward of the second outer race; and, a second plurality of rollers and a second plurality of roller springs disposed between the second inner race and the second outer race. In an example aspect, the switchable one way clutch assembly further comprises at least two selector brackets arranged to make switchable at least two one way clutches to provide selection of one or more of the following states: free wheel first and second opposing circumferential directions; locked in first circumferential direction and free wheel in second circumferential direction; free wheel in first circumferential direction and locked in second circumferential direction; and, locked in first and second circumferential directions.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

In an example aspect, a switchable roller one way clutch is disclosed. The switchable roller one way clutch is also referred to interchangeably herein as selectable roller one way clutch, bi-directional roller one way clutch, or simply as 'one way clutch', 'OWC', or 'clutch'. In an example aspect, the switchable roller one way clutch includes a selector bracket to vary between two states: (1) the 'neutral' state wherein the OWC is locked in one direction (i.e. clockwise) and free in the opposite direction (i.e. counter clockwise); and (2) the 'active' state wherein the OWC is locked in one direction (i.e. clockwise) and also locked in the opposite direction (i.e. counter clockwise).

In an example aspect, a set of springs is useful for urging the selector bracket to the neutral state for one of the clutches. In an example aspect, a radially disposed actuator pin engages a selector bracket to lock the clutch, or in other words, make 'active'. In an example aspect, a set of rollers and their respective springs act to urge the one way clutch to engage. In an example aspect, the rollers and their respective springs do not provide any additional lash; without being bound by theory, it is believed that lash is provided by the tangential travel that is required upon a torque reversal between a central race and two inner races, respectively. In an example aspect, springs disposed between the central race and the two inner races serve to dampen the transient response that any required lash creates.

Figure 1:
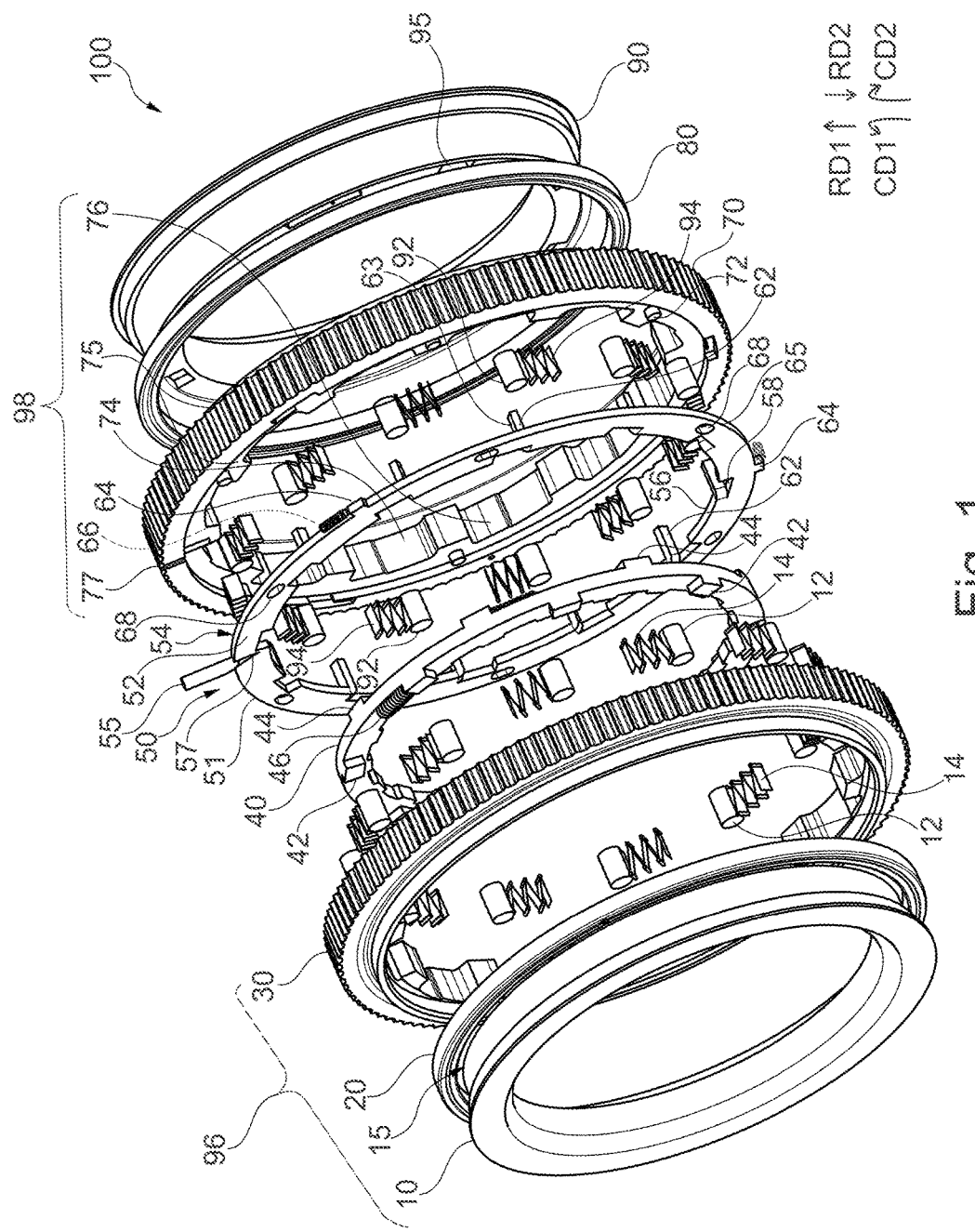
FIG. 1 illustrates an exploded view of a switchable one way clutch according to an example aspect.

The following description is made with reference to FIGS. 1 through 4. Selector bracket assembly 50, according to an example aspect, is useful in a switchable roller one way clutch assembly; selector bracket 50 is shown in greater detail in FIGS. 3A through 3C. FIG. 1 illustrates an exploded view of switchable roller one way clutch assembly 100 including: (a) inner race 10, also referred to as clockwise inner race or 'CW inner race', including indents 15 for receiving dog teeth 42; (b) thin section bearing 20; (c) outer race 30, also referred to as clockwise outer race or 'CW outer race'; (d) splined central race 40 including dog teeth 42 and 44 on either side for engagement with inner races 10 and 90 respectively, and further including dampening springs 46; (e) selector bracket assembly 50, which rides on positioning pins 72 machined into outer race 70, includes groove 57 for receiving actuator pin 55; (f) outer race 70, also referred to as counter clockwise outer race or 'CCW outer race'; (g) thin section bearing 80; and, (i) inner race 90, also referred to as counter clockwise inner race or 'CCW inner race', including including indents 95 for receiving dog teeth 44.

Figure 2:
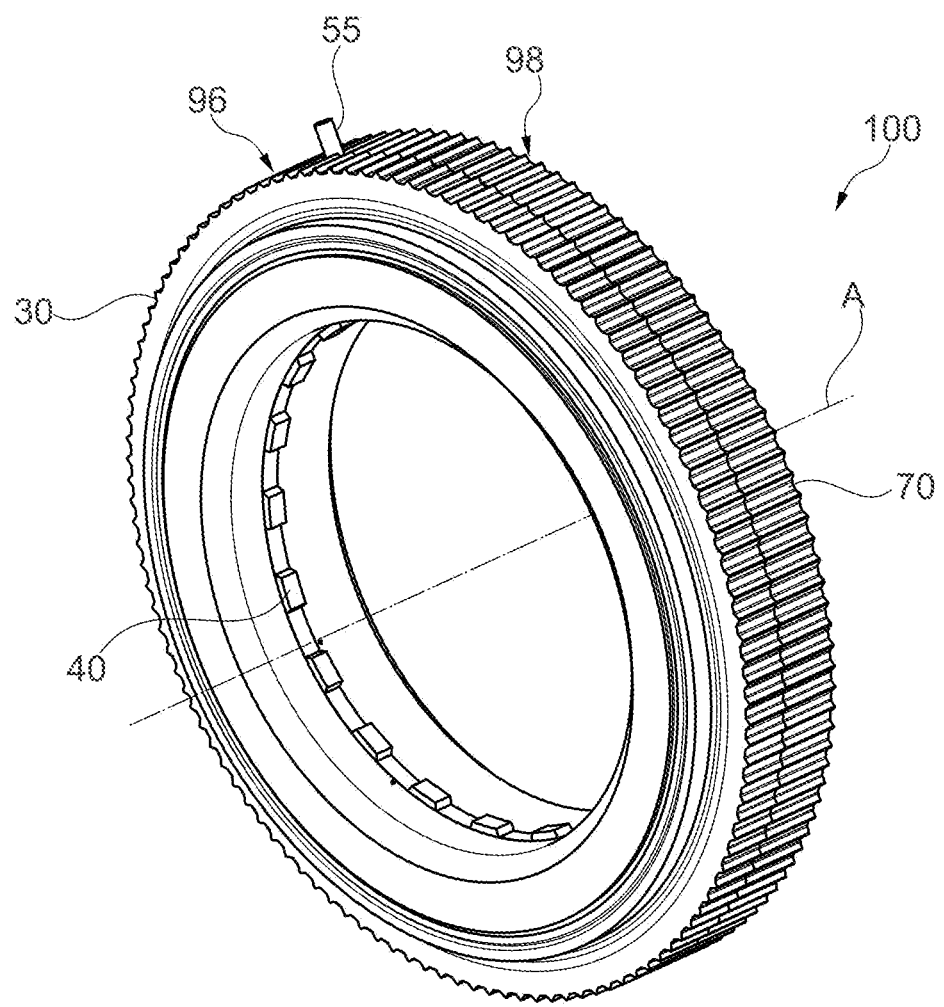
FIG. 2 illustrates a perspective view of a switchable one way clutch according to an example aspect.

FIG. 1 shows one way clutch 96 including inner race 10, thin section bearing 20, outer race 30, rollers 12, and roller springs 14; and one way clutch 98 including inner race 90, thin section bearing 80, outer race 70, rollers 92, and roller springs 94. In an example aspect, thin section bearings 20, 80 may alternatively be bushings. FIG. 2 illustrates a view of switchable one way clutch assembly 100 once assembled including: one way clutches 96 and 98 including outer races 30 and 70 respectively, selector bracket 50 (not shown), actuator pin 55, central race 40 having a splined inner diameter, and axis of rotation A. Radial direction RD1 is referred to as the direction radially outward with respect to axis A, and radial direction RD2 is referred to as the direction opposite thereto. Circumferential direction CD1 is the clockwise direction and circumferential direction CD2 is the counterclockwise direction, each with respect to axis A.

Figure 3A:
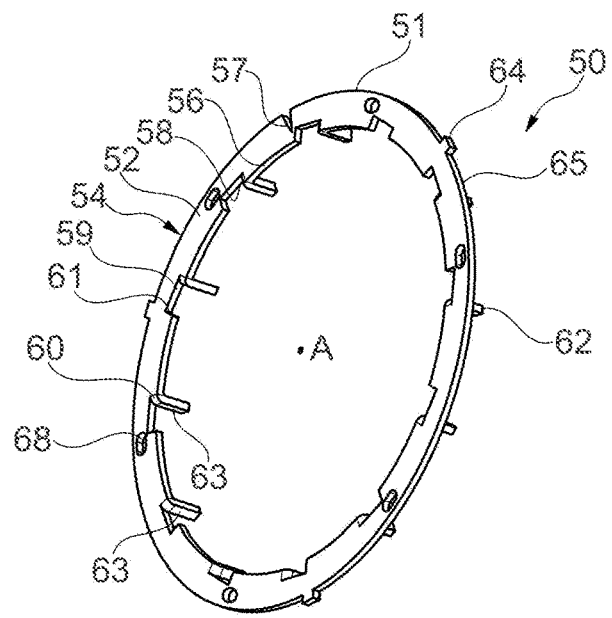
FIG. 3A illustrates a perspective view, FIG. 3B a top view, and FIG. 3C a side view of a selector bracket assembly according to an example aspect.
Figure 3B:
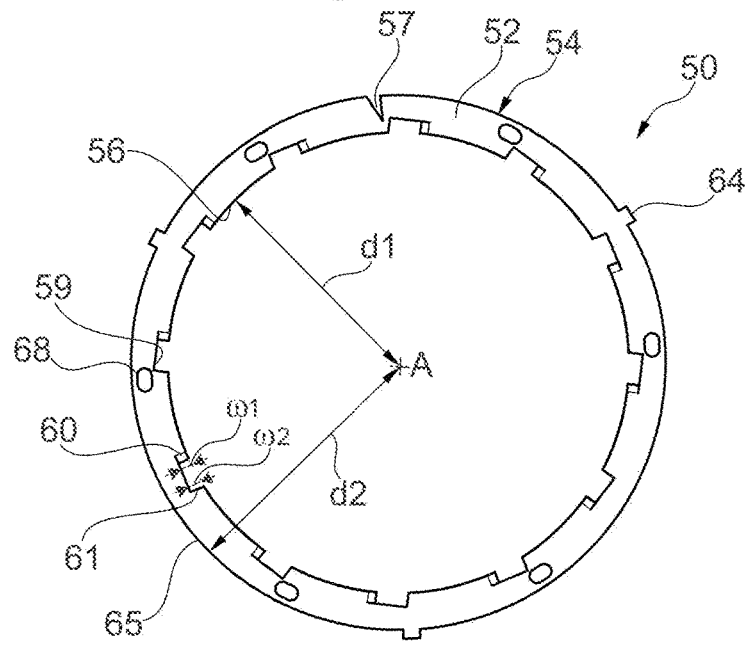
Figure 3C:
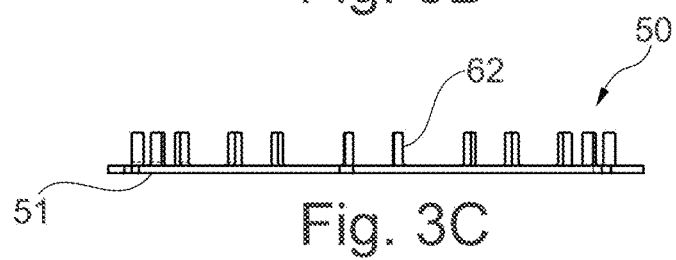

FIG. 3A illustrates a perspective view, FIG. 3B a top view, and FIG. 3C a side view of selector bracket assembly 50 according to an example aspect. As shown in FIGS. 1 through 3C, selector bracket assembly 50 includes selector bracket annular body portion 51 having radial surface 52 and opposite radial surface 54. Selector bracket 50 further includes inner circumferential surface 56 disposed at distance d1 with respect to axis of rotation A and outer circumferential surface 65 disposed at distance d2 with respect to axis A. Selector bracket 50 further includes at least one selector bracket cutout portion 58 and at least one axially extending post 62 adjacent to selector bracket cutout portion 58. Selector bracket cutout portion 58, also referred to interchangeably herein as simply 'cutout portion' or 'cutouts', include recess 59, arcuate or rounded surface 60, and side 61. Recess surface 59 is a distance of at least d1 and at most d2 from axis of rotation A. Arcuate or rounded surface 60 includes an edge having width w1. Side 61 includes an edge having width w2. Width w2 is greater than w1. Axially extending posts or legs 62 also include arcuate or rounded surface 60, in other words, arcuate or rounded surface 60 is a surface shared between axially extending posts 62 and cutout portion 58. As one skilled in the art appreciates, cutout portion 58 is formed from stamping or laser cutting the selector bracket, which may be steel or other suitable material. In an example aspect, axially extending posts 62 are formed by bending the tangential rectangular-shaped legs at rounded surface 60 edge having width w1. Axially extending posts 62 include planar surface 63, which prior to forming and bending is continuous with radial surface 52. The width of planar surface 63 is same or equal to w1.

Selector bracket assembly 50 further includes a plurality of radially outward extending tabs 64 and circumferentially extending bracket springs 66 (shown in FIG. 1) adjacent to radially outward extending tabs 64. Radially outward extending tabs 64 are also referred to interchangeably herein as bracket tabs 64. Circumferentially extending bracket springs 66 are also referred to interchangeably herein as neutral position springs 66. Annular body portion 51 further includes apertures 68, also referred to interchangeably herein as through holes 68 or radially distributed holes 68, extending from radial surface 52 to opposite radial surface 54. Apertures 68 are, in an example aspect, rectangular, rounded, oblong, oval, or radial slots. In an example aspect, oval apertures 68 as shown in FIG. 1 allow positioning pins 72 to circumferentially offset to position selector bracket 50 as desired. At least one actuator pin 55 is disposed radially outward of inner circumferential surface 56. Actuator pin 55 is displaced radially inward for engagement in order to lock one way clutch assembly 100, more particularly in an example aspect, to lock one way clutch 98.

Figure 4A:
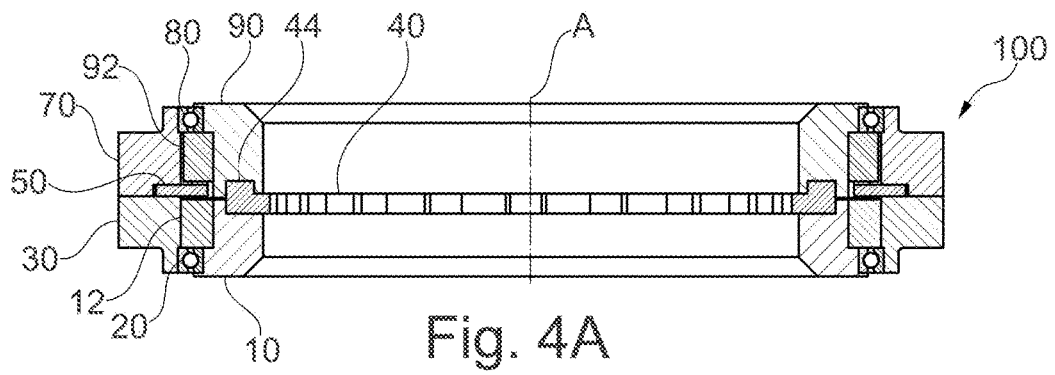
FIG. 4A illustrates a cross-sectional view including a slice through rollers of a switchable one way clutch according to an example aspect.
Figure 4B:
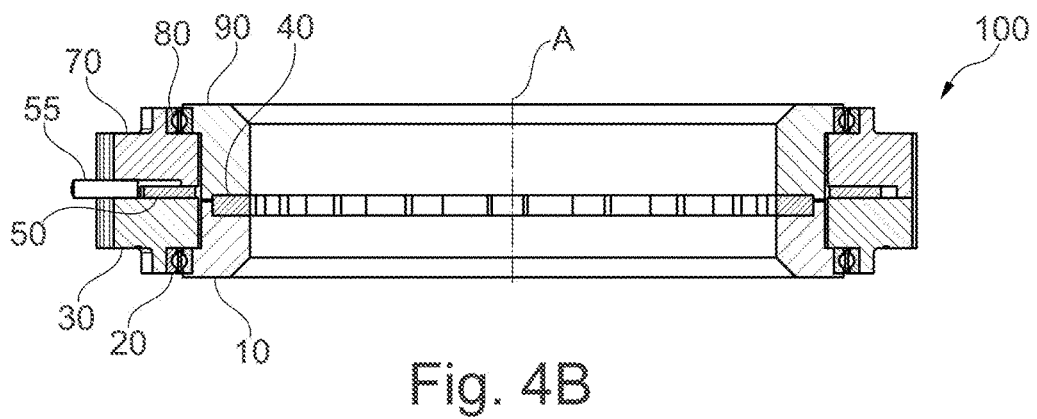
FIG. 4B illustrates a cross-sectional view including a slice though an actuator pin of a switchable one way clutch according to an example aspect.
Figure 4C:
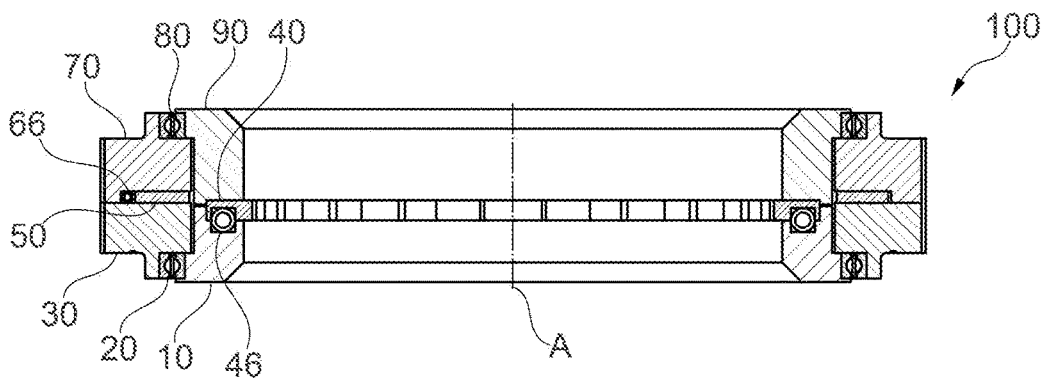
FIG. 4C illustrates a cross-sectional view including a slice through circumferentially extending bracket springs, or 'neutral' springs, and dampening springs of a switchable one way clutch according to an example aspect.

FIG. 4A illustrates a cross-sectional view including a slice through rollers 12, 92 of switchable one way clutch 100 according to an example aspect. FIG. 4B illustrates a cross-sectional view including a slice though actuator pin 55 of switchable one way clutch 100 according to an example aspect. FIG. 4C illustrates a cross-sectional view including a slice through circumferentially extending bracket springs 66, or 'neutral' springs 66, and dampening springs 46 of switchable one way clutch 100 according to an example aspect.

Referring again to FIGS. 1 through 4, in an example aspect, actuator pin 55 of selector bracket 50 is arranged for engagement in a lock-lock (or 'active') state and for disengagement in a lock-free wheel (or 'neutral') state.

In an active state, actuator pin 55 travels radially inward in radial direction RD2 to engage with groove or ramp 57 to rotate bracket 50 about axis A, thus moving selector bracket 50 in circumferential direction CD2 (counter clockwise). Actuator pin 55 is engaged by radial displacement inwards actuated by a solenoid, hydraulic pressure, or by other means as known by those skilled in the art. Actuator pin engagement pushes bracket tabs 64 so that rollers 92, urged by roller springs 94, contact outer race inner ramps 74, thereby locking one way clutch 98. Circumferentially extending bracket springs 66, disposed adjacent to radially outward extending tabs 64, are arranged for circumferential movement of selector bracket 50 with respect to outer race 70. Apertures 68 are for positioning selector bracket 50 with respect to outer race positioning pins 72 of outer race 70. Outer race 70 further includes outer race face 75, spring pockets 76, and bore 77 for receiving actuator pin 55.

In an example aspect, in the neutral state, actuator pin 55 is disengaged and circumferentially extending bracket springs 66 push selector bracket 50 into a neutral position, which in turn pushes the rollers 92 against roller springs 94 to disengage them from outer race 70. The plurality of axially extending posts 62 are for urging rollers 92 away from outer race inner ramp 74 in a free or inactive state, also referred to as neutral state. For torque applied in circumferential direction CD1 (clockwise), behavior is as in 'neutral' state. Without being bound by theory, when torque is applied in the clockwise direction, the torque is transferred from splined central race 40 to inner race 90 through dog teeth 42 after travelling through about 2° of required lash dampened by dampening springs 46. Dampening springs 46 are disposed between central race 40 and each inner race 10 and 90; in other words, there are two sets of dampening springs 46. When the torque is reversed and the inner assembly, which includes a central race and two inner races, spins counter clockwise, no locking occurs and the three races (central and inner races) are allowed to spin freely in the counter clockwise direction.

However, for torque applied in circumferential direction CD2 (counterclockwise), central race 40 travels through 2° of damped lash before engaging inner race 90. The dampening reduces noise on torque reversal and the forced travel allows inner race 10 to enter a state of zero-torque. Likewise, when torque is reversed back to the CD1 direction, inner race 10 will lock after central race 40 travels 2°, which puts inner race 90 at zero torque and assembly 100 is returned to 'neutral' state by removing force on actuator pin 55 and allowing the circumferentially extending bracket springs 66 to rotate selector bracket 50 and disengage rollers 92 from outer race 70.

In yet another example aspect, two selector brackets are employed to make switchable two one way clutches to provide the following states: free wheel in first and second opposing circumferential directions, locked in first circumferential direction, locked in second circumferential direction, or locked in both circumferential directions.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

LISTING OF ELEMENTS 10 inner race (CW)
12 rollers
14 roller springs
15 inner race indents
20 thin section bearing, or bushing
30 outer race (CW)

40 central race
42 dog teeth for contacting inner race 10
44 dog teeth for contacting inner race 90
46 dampening springs
50 selector bracket assembly
51 selector bracket annular body portion
52 radial surface
54 opposite radial surface
55 actuator pin
56 inner circumferential surface, distance d1 from axis A
57 groove, or ramp
58 selector bracket cutout portion
59 recess, distance between d1 and d2 from axis A
60 arcuate or rounded surface, having edge width w1
61 side, having edge width w2
62 axially extending posts or legs
63 planar surface of axially extending post
64 radially outward extending tabs
65 outer circumferential surface, distance d2 from axis A
66 circumferentially extending bracket springs, or 'neutral' springs
68 apertures, or oval apertures
70 outer race (CCW)
72 positioning pins
74 outer race inner ramp
75 outer race face
76 outer race spring pocket
77 bore for receiving actuator pin
80 thin section bearing, or bushing
90 inner race (CCW)
92 rollers
94 roller springs
95 inner race indents
96 one way clutch
98 one way clutch
100 one way clutch assembly

What I claim is:

1. A switchable one way clutch assembly comprising:
   first and second outer races;
   at least one selector bracket assembly disposed between the first and second outer races, the at least one selector bracket assembly comprising:
      a selector bracket annular body portion having:
         a first radial surface;
         a second radial surface, opposite the first radial surface;
         an inner circumferential surface, connecting the first and second radial surfaces;
         at least one cutout portion;
         at least one axially extending post adjacent to the at least one cutout portion; and,
         an outer circumferential surface including a plurality of radially outward extending tabs; and,
      at least one actuator pin disposed radially outward of the inner circumferential surface and arranged for engagement with the selector bracket assembly to lock a one way clutch;
   first and second inner races disposed radially inward of the first and second outer races, respectively;
   a splined central race disposed between the first and second inner races and including axially protruding dog teeth arranged for engagement with the first and second inner races respectively;
   a first plurality of rollers and a first plurality of roller springs disposed between the first inner race and the first outer race; and, a second plurality of rollers and a second plurality of roller springs disposed between the second inner race and the second outer race.

2. The switchable one way clutch assembly as in claim 1 wherein the at least one actuator pin is disengageable to allow the one way clutch assembly to free wheel in at least one direction.

3. The switchable one way clutch assembly as in claim 1 wherein the at least one axially extending post includes a planar surface arranged for urging at least one roller away from an outer race inner ramp for unlocking the one way clutch in a neutral state.

4. The switchable one way clutch assembly as in claim 1, wherein the at least one selector bracket assembly further comprises a plurality of circumferentially extending bracket springs disposed adjacent to the plurality of radially outward extending tabs; wherein the circumferentially extending bracket springs are arranged for circumferential movement of the selector bracket assembly with respect to an outer race.

5. The switchable one way clutch assembly as in claim 3 wherein the at least one cutout portion includes a rounded surface having a first width (w1), a side having a second width (w2), and a recess; wherein the second width (w2) is greater than the first width (w1); and, wherein the rounded surface is connected to the planar surface of the at least one axially extending post.

6. The switchable one way clutch assembly as in claim 1, wherein the at least one selector bracket assembly further comprises a plurality of apertures extending from the first radial surface to the second radial surface and arranged for receiving a plurality of positioning pins.

7. The switchable one way clutch assembly as in claim 1 further comprising first and second thin section bearings, the first thin section bearing disposed between the first inner race and the first outer race and the second thin section bearing disposed between the second inner race and the second outer race.

8. The switchable one way clutch assembly as in claim 1 wherein the at least one selector bracket assembly is arranged to vary between a lock-free wheel state and a lock-lock state.

9. The switchable one way clutch assembly as in claim 1, wherein the second outer race further includes at least one outer race inner ramp, wherein the at least one inner ramp is arranged to engage at least one roller in a lock-lock state.

10. A switchable one way clutch assembly comprising:
   a first outer race and a first inner race disposed radially inward of the first outer race;
   at least one selector bracket assembly including an actuator pin and a plurality of circumferentially extending bracket springs;
   a splined central race disposed between the first inner race the at least one selector bracket assembly and including axially protruding dog teeth arranged for engagement with the first inner race;
   a first plurality of rollers and a first plurality of roller springs disposed between the first inner race and the first outer race;
   wherein in a neutral state:
      the actuator pin is disengaged;
      the plurality of circumferentially extending bracket springs are arranged for pushing the at least one selector bracket assembly into a neutral position;
      the first plurality of rollers are arranged for pushing against the first plurality of roller springs for disengagement from the first outer race; and, the first outer race is arranged to spin freely in a first circumferential direction; and, wherein in an active state:

the actuator pin is displaced radially inward to engage and the first inner race is not movable in a first circumferential direction;

the first plurality of rollers are disposed and in contact with the first inner race and the first outer race; and, the first outer race is arranged to lock.

11. The switchable one way clutch assembly as in claim 10 wherein the at least one selector bracket assembly further comprises an annular body portion including a first radial surface, a second radial surface opposite the first radial surface, and an inner circumferential surface having at least one cutout portion.

12. The switchable one way clutch assembly as in claim 11, wherein the first outer race further includes at least one outer race inner ramp, wherein the at least one inner ramp is arranged to engage at least one roller in a lock-lock state.

13. The switchable one way clutch assembly as in claim 10 further including a second outer race and a second inner race disposed radially inward of the second outer race; and, a second plurality of rollers and a second plurality of roller springs disposed between the second inner race and the second outer race.

14. The switchable one way clutch assembly as in claim 13 further comprising at least two selector brackets arranged to make switchable at least two one way clutches to provide selection of one or more of the following states:

free wheel first and second opposing circumferential directions;

locked in first circumferential direction and free wheel in second circumferential direction;

free wheel in first circumferential direction and locked in second circumferential direction; and, locked in first and second circumferential directions.

* * * * *